UNITED STATES PATENT OFFICE.

MACPHERSON ROBERTSON, OF FITZROY, VICTORIA, AUSTRALIA.

PROCESS OF COATING CONFECTIONERY.

1,021,705.   Specification of Letters Patent.   Patented Mar. 26, 1912.

No Drawing.   Application filed September 22, 1911. Serial No. 650,808.

*To all whom it may concern:*

Be it known that I, MACPHERSON ROBERTSON, a subject of the King of Great Britain and Ireland, &c., residing at Fitzroy, in the State of Victoria, Commonwealth of Australia, have invented a certain new and useful Process of Coating Confectionery; and I do hereby declare the following to be a full, clear, and exact description of the invention, such as will enable others skilled in the art to which it appertains to make and use the same.

It has been found that as long as two days is required from the time of finishing the cores of gum drops, jubejubes, jellies, and other articles of confectionery, and their completion by providing them with a crystallized covering or coating of sugar, ready for packing.

A number of disadvantages are attached to existing methods of obtaining the coatings, in addition to the loss of time and material. When a suitable crystal syrup has been cooked and cooled, and the confections (of which for convenience I will mention drops or jubes in this specification by way of example) are immersed in the syrup, and left overnight, or for a sufficient time, the syrup is by present methods drained off. But much has still to be done. The drops or other confections are found, in many cases, to be sticking together if they have been placed at all closely, and it becomes necessary to have employees pick them apart. This handling is objectionable, especially where the confections are soft, in which form many are at their best. The picking tends to destroy the shape, to break the cover of sugar, and to develop white marks, especially where starch has adhered from the molds, and so to produce an inferior appearance generally.

Now without attempting to set forth all the objections of the existing methods I will describe my improvements, first however pointing out that confections have been sugar covered by damping them exteriorly, and while damp mixing them with sugar on a table by hand. This is the worst method of preparing the goods known to me.

My improvements relate not to all sugar coverings such as those that are hard and smooth but to those in which the finished gum drops and so forth are of the class called crystallized. I find that a couple of hours, and less if desired, will suffice, instead of the two days aforesaid, to add my coatings and that the goods produced are superior to any of the same class produced by other methods known to me.

No picking apart is requisite with my confections and when they are completed the brilliancy of the core is seen through the coating which has an exceedingly attractive surface, is strong and unbroken, and protects the core in a superior way.

I take any suitable cores both as to material or shape, for example, common gum drops of rose color. I spread these on gratings, in cages of wire work, or on any other suitable supports such that the exterior of each confection will be accessible to subsequently applied steam. Then I place them, by any suitable means, where they will be subjected to steam, which I liberate into any suitable chamber or place for that purpose. I may leave part of such a chamber open, so that trays or cages could be placed in and removed readily. When inserted each confection will come into intimate contact with hot steam, and the exterior of each will become melted or thoroughly damped and somewhat heated to suit the next step. The steaming takes some seconds and then I place the jubejubes or other confections into a mass of crystalline sugar, which it is best to have of some uniform grade.

I do not exclude admixtures with the sugar of flavorings, fine cocoanut, or so on in such slight proportions as will not prevent the successful coating effect that is to be attained; but I will for convenience refer to all such coatings as sugar coatings. I cover in any suitable way each confection with the sugar, mixing being performed in any suitable way as by hand or in a pan. This may take some few minutes. Then I permit the covered but still unfinished confections to dry, placing them (in motion or otherwise) in any suitable place which may be warm. Then the confections are spread on perforated trays, in cages or so forth and are again subjected in any suitable way to heat and moisture in the form of steam.

I find it advantageous to liberate steam under considerable pressure into a closed or open chamber of suitable kind. By this step the steam is caused at once to partly melt the material and to more firmly bind on the sugar and complete the coating desired.

On the removal of the confections they are allowed to cool, or are dried, and then will be found to possess a practically transparent lustrous or sparkling skin or coating exhibiting the rich color of the core and superior to any secured by old methods of crystallization. The appearance produced by the use of pure sugar will however be modified when additions are made of a slight percentage of, for example, cocoanut. In minor respects the process can by those skilled in the art, be readily modified while keeping however some matter of my invention.

My process can be largely conducted by hand or can be aided to any desired extent by machinery. There has not hitherto been produced such a confection with a skin of sugar cooked on in the presence of hot steam. It is not the same confection as if its skin had been produced by crystallization through soaking in syrup. It is superior to that produced by hand application of dry sugar, as the interstices and cracks of the latter are not found in my product. The latter has also an advantage of economy over the product secured by deposition arrived at from soakage in syrup, because the deposit is but portion of the syrup, and what is left of the latter is a residue not of such value or richness as the original syrup. In my case, the skin uses up the whole of the sugar leaving no residue.

It is now clear that my process is one whereby sugar not in the form of syrup is fixed or cooked on by such a brief application of hot steam that a crystallization or sparkling effect is nevertheless retained. The sugar is by no means melted down into a general flatness; this would kill the brilliance and unevenness that must be retained and would give an entirely different effect, that could no longer keep the goods in the crystallized class.

What I claim Letters Patent for United States is:—

1. The process of manufacturing confectionery, which consists in supplying a suitable core, in applying granulated sugar to the exterior of said core, and in then subjecting the core so coated to the action of hot steam for a brief period, substantially as described.

2. The process of manufacturing confections, which consists in first providing a suitable core, second rolling said core in granulated sugar, and in third treating said core so coated with live steam, substantially as described.

In witness whereof I have hereunto set my hand in the presence of two witnesses.

MACPHERSON ROBERTSON.

Witnesses:
G. G. TURRI,
WILLIAM L. BEATTIE.